United States Patent [19]
Yamada et al.

[11] Patent Number: 5,126,196
[45] Date of Patent: Jun. 30, 1992

[54] PROTECTIVE DEVICE FOR A HERMETIC MOTOR-DRIVEN COMPRESSOR

[75] Inventors: Hidehiko Yamada; Shigeru Muramatsu, both of Shizuoka, Japan

[73] Assignee: Mitsubishi Denki Kabushiki Kaisha, Tokyo, Japan

[21] Appl. No.: 409,295

[22] Filed: Sep. 19, 1989

[30] Foreign Application Priority Data

Sep. 26, 1988 [JP] Japan .................. 63-240078

[51] Int. Cl.⁵ .............. B32B 27/08; B32B 27/34; B32B 1/08; H02K 3/34
[52] U.S. Cl. .................. 428/34.3; 428/474.4; 174/138 E; 310/215; 336/219
[58] Field of Search ............ 428/474.4, 34.3; 310/215; 174/138 E; 336/219

[56] References Cited
U.S. PATENT DOCUMENTS

| | | | |
|---|---|---|---|
| 3,554,966 | 1/1971 | Jones et al. | 260/47 |
| 4,263,475 | 4/1981 | McNeal | 174/138 E |
| 4,499,517 | 2/1985 | Lisauskas | 361/24 |
| 4,646,195 | 2/1987 | Lisauskas | 361/25 |
| 4,701,824 | 10/1987 | Beggs et al. | 361/24 |
| 4,706,152 | 11/1987 | DeFilippis et al. | 361/32 |
| 4,713,717 | 12/1987 | Pejouhy et al. | 361/26 |

FOREIGN PATENT DOCUMENTS 271812  4/1965  Australia.
401345  2/1967  Australia.

OTHER PUBLICATIONS

Texas Instruments Incorporated, "A Guide for Application of the 15HM Protector" and Drawings, 9 pages.

Primary Examiner—George F. Lesmes
Assistant Examiner—T. Morris
Attorney, Agent, or Firm—Oblon, Spivak, McClelland, Maier & Neustadt

[57] ABSTRACT

A protective device for a hermetic motor-driven compressor comprises a protective device main body and an insulating layer made of a heat-resisting insulating material having a heat-resisting temperature of 155° C. or higher, wherein the insulating layer surrounds the main body.

2 Claims, 3 Drawing Sheets

FIGURE 5 PRIOR ART
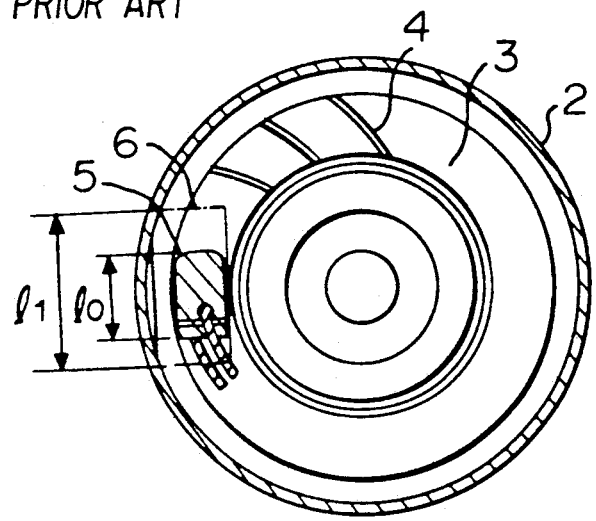
FIGURE 6 PRIOR ART
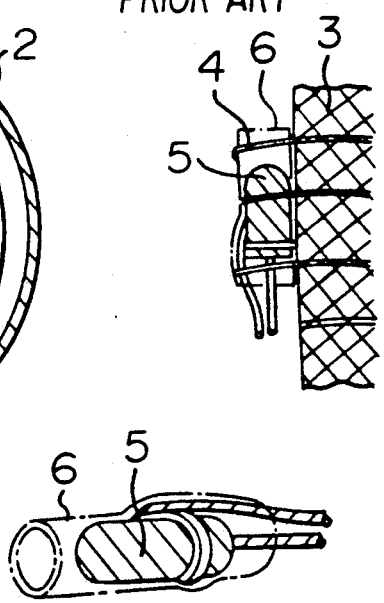
FIGURE 7 PRIOR ART
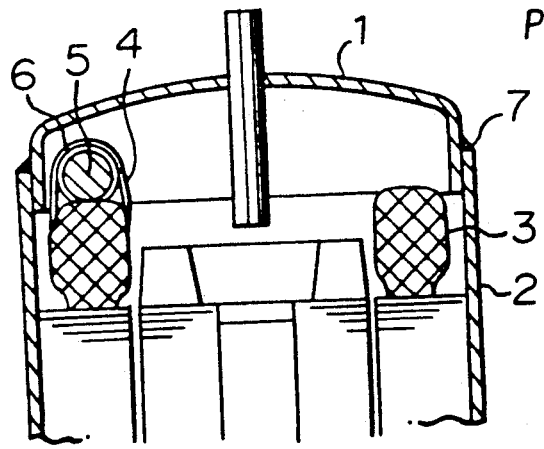
FIGURE 8 PRIOR ART

PROTECTIVE DEVICE FOR A HERMETIC MOTOR-DRIVEN COMPRESSOR

BACKGROUND OF THE INVENTION

1. Field of the Invention

The present invention relates to an improvement in a current temperature sensitive type overload protective device to be mounted on a motor for a hermetic motor-driven compressor and an improvement in a method of attaching the same.

2. Description of the Related Art

There has been known a current/temperature sensitive type overload protective device (hereinafter, referred to as a protective device) which is provided in the casing of a hermetic motor-driven compressor so as to electrically disconnect a motor for the compressor from a power source by sensing predetermined temperature values of the motor and a refrigerant gas as well as a predetermined value of overcurrent in a case that the hermetic motor-driven compressor is operated under a condition of overload.

FIGS. 5 to 10 show examples of attaching a conventional protective device to a typical hermetic motor-driven compressor as disclosed in, for instance, Japanese Unexamined Utility Model Publication 175581/1981. A protective device 5 is placed in contact with the surface of a motor end coil 3 and is fixed thereto by means of a binding string 4.

FIGS. 5, 6 and 8 show the examples that the protective device 5 is attached to the upper end portion of the motor end coil 3, and FIGS. 9 and 10 show the examples that the protective device 5 is attached to a side area of the motor end coil 3.

FIG. 7 is an enlarged perspective view showing a conventional protective device 5 wherein the main body of the protective device 5 which is an electrically charged portion is covered by an insulating layer 6 of a hard film material such as polyester film. As shown in FIG. 5, the insulating layer 6 of a polyester film is wrapped around the protective device 5 in a cylindrical form with both ends being opened wherein overlapping portions are bonded. The length $l_1$ in the axial direction of the cylindrically formed insulating layer 6 is generally 1.5–2 times as long as the length $l_0$ of the protective device 5 in order to keep a sufficient distance of the space for electric insulation.

Since the insulating layer 6 is hardly deformed when it is attached to the motor end coil 3, the dimension of $l_1$ is necessary.

Since hermetic motor-driven compressors are generally of a small size, it was difficult to attach a protective Further, there was a problem that since the protective device 5 was placed near a portion where an upper casing 1 and a lower casing 2 were welded together to form a hermetic casing, a polyester film used generally as an insulating layer 6 for the protective device 5 was easily molten by heat of radiation at the time of welding to thereby lose the function of insulation.

SUMMARY OF THE INVENTION

It is an object of the present invention to provide a protective device having an insulating layer excellent in heat resistance and facilitating attachment to a motor end coil.

In accordance with the present invention, there is provided a protective device for a hermetic motor-driven compressor which comprises a protective device main body and an insulating layer made of a heat-resisting insulating material having a heat-resisting temperature of 155° C. or higher, wherein the insulating layer surrounds the main body.

BRIEF DESCRIPTION OF THE DRAWINGS

In the drawings:

FIG. 5 is a plane view partly cross-sectioned of a hermetic motor-driven compressor on which a conventional protective device is mounted;

FIG. 6 is an enlarged side view which shows an example of attaching a conventional protective device to a motor coil end;

FIG. 7 is an enlarged perspective view showing the conventional protective device;

FIGS. 8 and 9 are respectively longitudinal cross-sectional views partly omitted of hermetic motor-driven compressor in which a conventional protective device is mounted.

DESCRIPTION OF THE PREFERRED EMBODIMENTS

Figure 1:
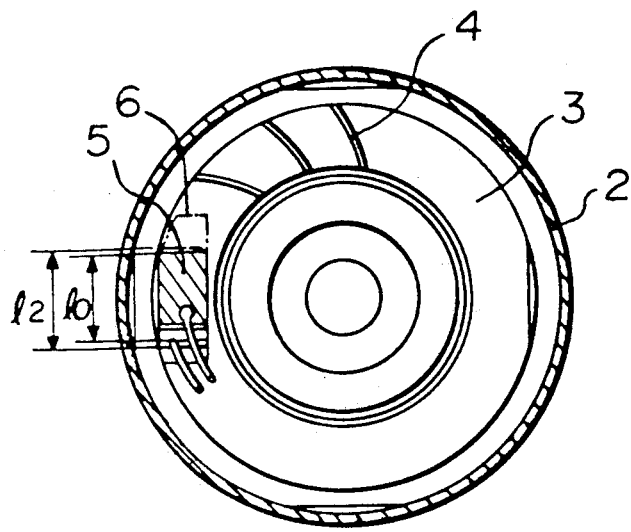
FIG. 1 is a front view partly cross-sectioned of a hermetic motor-driven compressor on which a protective device according to the present invention is mounted.
Figure 2:
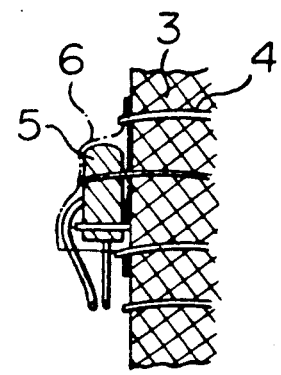
FIG. 2 is an enlarged side view partly omitted which shows an example of attaching a protective device to a motor end coil.

An embodiment of the protective device for a hermetic motor-driven compressor of the present invention will be described with reference to FIGS. 1 to 4 wherein the same reference numerals as in FIGS. 5 to 10 designate the same parts.

A protective device 5 which is the subject to be protected is in contact with the surface of a motor end coil 3 and is fixed thereto by means of a binding string 4.

Figure 3:
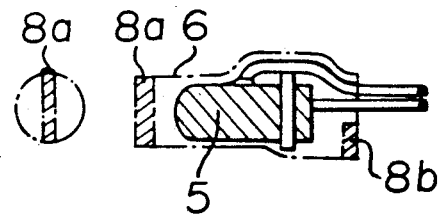
FIG. 3 is enlarged front view showing the protective device.
Figure 4:
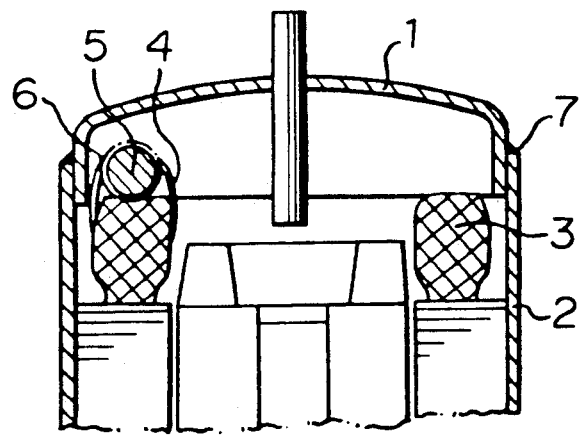
FIG. 4 is a longitudinal cross-sectional view partially omitted of a hermetic motor-driven compressor on which the protective device according to the present invention is mounted.
Figure 9:
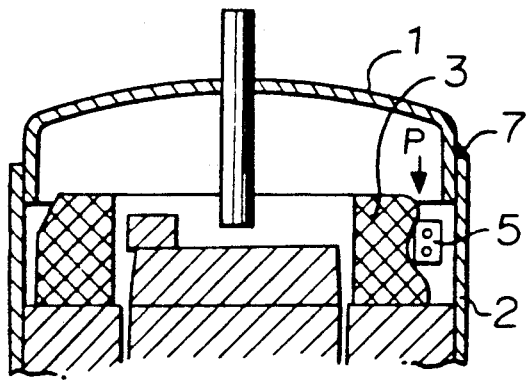
Figure 10:
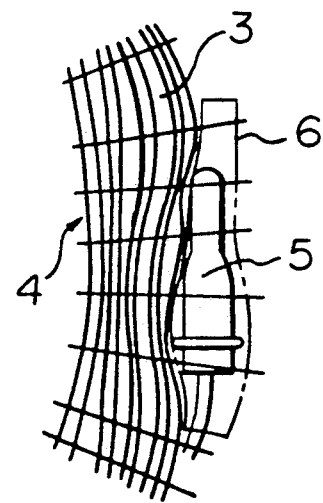
FIG. 10 is a partly enlarged view when viewed from the direction P in FIG. 9.

FIG. 3 shows the protective device 5 according to the present invention. The main body constituting an electrically charged portion of the protective device 5 is covered by an insulating layer 6. A sheet of aromatic polyamide (an aramid sheet) is used as the insulating layer 6. The insulating layer is formed into a cylindrical shape. Both end portions of the cylindrically shaped insulating layer 6 are respectively closed to be in a form of a bag so that the protective device 5 is entirely surrounded in it. The closed end portions 8a, 8b are melt-welded by applying ultrasonic waves. As shown in FIG. 1, the protective device 5 having its dimension $l_0$ in the longitudinal direction is attached to the motor end coil 3. In this case, the insulating layer 6 can be easily deformed by winding the binding string 4 around the motor end coil 3 so that the dimension $l_2$ of the insulating layer 6 can be substantially the same as the dimension $l_0$ of the protective device 5.

In the above-mentioned embodiment, the aramide sheet is used as a material for the insulating layer 6. However, another material may be used so long as the materials has a heat resistance property of 155° C. or higher. For instance, a sheet of polyimide resin may be used.

Thus, in accordance with the present invention, the protective device main body is surrounded by the insulating layer made of a heat resisting material having a heat resisting temperature of 155° C or higher. Accordingly, the insulating layer can withstand heat of radiation when a hermetic casing is prepared by welding.

Further, the aramid sheet is used for the insulating layer and both ends of the insulating layer are respectively melt-bonded by ultrasonic waves to have a shape of bag. Accordingly, it is unnecessary to use an adhesive and therefore the protective device of the present invention is not chemically attacked even when it is used in an atmosphere of refrigerant.

We claim:

1. A protective device for a hermetic motor-driven compressor which comprises a protective device main body and a cylindrically shaped insulating layer made of an aramid sheet, wherein said insulating layer surrounds said main body and said insulating layer has its end portions melt-bonded by ultrasonic welding.

2. The protective device for a hermetic motor-driven compressor according to claim 1, wherein said insulating sheet is formed into a bag to receive therein said main body by the melt-bonding of said opposing end portions of said cylindrically shaped insulating sheet.

* * * * *